July 27, 1943.　　　　　H. L. WILCOX　　　　　2,325,454

HOIST CONTROL SYSTEM

Filed Aug. 25, 1941　　　　　2 Sheets-Sheet 1

KEY:
——— POWER HOISTING & LOWERING
——— SINGLE PHASE BRAKING
- - - COUNTER TORQUE LOWERING

INVENTOR.
HARRY L. WILCOX
BY
John H. Leonard
& Harold J. Rathbun
his Attorneys

July 27, 1943.  H. L. WILCOX  2,325,454
HOIST CONTROL SYSTEM
Filed Aug. 25, 1941   2 Sheets-Sheet 2

INVENTOR.
HARRY L. WILCOX
BY John H. Leonard &
Harold J. Rathbun,
his attorneys.

Patented July 27, 1943

2,325,454

UNITED STATES PATENT OFFICE 2,325,454

HOIST CONTROL SYSTEM

Harry L. Wilcox, Cleveland, Ohio, assignor to The Electric Controller & Manufacturing Company, Cleveland, Ohio, a corporation of Ohio Application August 25, 1941, Serial No. 408,153

16 Claims. (Cl. 172—152)

This invention relates to electric systems of control for alternating current induction motors which are utilized as the driving motors for apparatus in which the load at times overhauls the motor and drives it, and in which the overhauling load must be retarded to prevent the overhauling speed from becoming excessive and, at times, must be brought to a full stop. The invention is particularly applicable to hoist motors which may be overhauled and driven by a descending load, and the invention is hereinafter described as applied to that use.

Heretofore when polyphase wound rotor induction motors have been used to operate electric hoists, descending loads have been retarded by short circuiting a portion of the primary winding of the motor and concurrently energizing a portion of the primary winding with single phase current while maintaining a predetermined amount of resistance in the secondary circuit of the motor. The single phase braking action results from the rotation of a rotor circuit of high resistance through an unsymmetrical field set up due to energization of the primary from a source of power having preponderantly single phase characteristics and the presence of a local closed path of low resistance in the primary circuit. As used herein, single phase source of power refers to a source having preponderantly single phase power characteristics and single phase braking refers to braking action obtained by connecting the primary to such a source with a portion of the primary short circuited, i. e., connected in a local circuit of low impedance. This type of control has proved very successful for a large proportion of electric hoist applications, and is particularly well suited for hoists requiring accurate inching control.

Also, in hoists equipped with polyphase wound rotor induction motors, counter-torque control has been used in which descending loads are retarded by connecting the motor to a source of power having preponderantly polyphase characteristics for causing the motor to exert a motor torque which is opposed to the torque of the descending load. Since the opposition or reverse motor torque must also be used to hoist the load, and since for hoisting operations the reverse torque must be varied throughout a range of high values, whereas for optimum results during lowering operations the reverse torque should be variable throughout a range of smaller values, difficulty has been experienced in providing a simple control system which is readily adjustable to give two such ranges of reverse torque. Furthermore, counter-torque control systems lack accuracy in the control of small and inching movements of the load. A further complication is involved when it is desired to include in such control systems a means to control accurately small movements of the load and to bring the motor to a complete stop while constraining the motor from reversing the load.

In accordance with this invention a control system for a polyphase wound rotor hoist motor is provided in which the operator of the hoist may select at will one of the two ranges of reverse torque. For hoisting operations, movement of the master switch through successive hoisting positions results in short circuiting of the secondary resistance in steps to give several values of reverse torque from a moderately low value to the maximum torque of the motor. The secondary resistance is so constituted that, upon operation of an auxiliary switch, the hoisting positions of the master switch are rendered effective for short circuiting of the secondary resistance in steps in such a manner that at times the secondary circuit is unbalanced and a group of torque values varying throughout a predetermined low range suitable for lowering operations or counter-torque braking is obtained.

Counter-torque control of the improved type disclosed by this invention is most suitable when loads must be lowered long distances at slow speeds. Such conditions are commonly encountered in the operation of shipway cranes. On the other hand, for short movements and inching operations, all known types of counter-torque control have certain disadvantages. For example, it is at times extremely difficult or impossible for the operator of a counter-torque controller to determine, without trial, which direction the control handle of the master switch should be moved to obtain a desired load movement since there is not a uniform relation between the speed and direction of the load movement and the direction of the master switch movement.

For obtaining satisfactory control for long movements and short movements and inching operations it is necessary to combine single phase braking with counter-torque control in a manner such that both cooperate to render the control system of universal application. In accordance with this invention both single phase braking and counter-torque control are so combined as to utilize the same secondary resistors, contactors, and speed control relays and therefore to simplify and centralize the control for both of these operations as well as power lowering and power hoisting.

Connection of the motor for power hoisting, power lowering, counter-torque lowering, and single phase braking not only introduces complications in the control of the secondary resistance, but also complicates the use of control relays which must be used not only to prevent too rapid commutation of the secondary resistance but for other control functions as well. The most satisfactory control relay is responsive to the speed or a function of the speed of the hoist motor. In accordance with this invention relays responsive to the secondary frequency of the hoist motor are so connected that a minimum number is used, some of which are arranged to operate at more than one value of motor speed.

It is an object of this invention to provide a control system for a wound rotor induction motor which provides a simple and centralized control of both counter-torque control and single-phase braking.

A further object is to provide an improved system of counter-torque control for a wound rotor induction motor.

Another object is to provide a control system for an alternating current motor in which the operator can select either single-phase or counter-torque braking and in which the counter-torque is comparable in magnitude to the single phase braking torque.

An important object of this invention is to so arrange the several sections of the secondary resistance of a wound rotor induction motor that a range of high values of torque useful for hoisting and a range of lower values of torque useful for retarding overhauling loads are available. A correlative object is to combine with the ranges of torque values, a suitable value of single phase braking torque.

A further object is to provide a simple induction motor control system which is capable of connecting the motor selectively for power hoisting, power lowering, counter-torque lowering, and single phase braking.

A further object is to provide an improved and automatic means to discontinue the single phase connections when the motor approaches standstill.

Other objects and advantages will become apparent from the following specification wherein reference is made to the drawings, in which.

Figure 1:
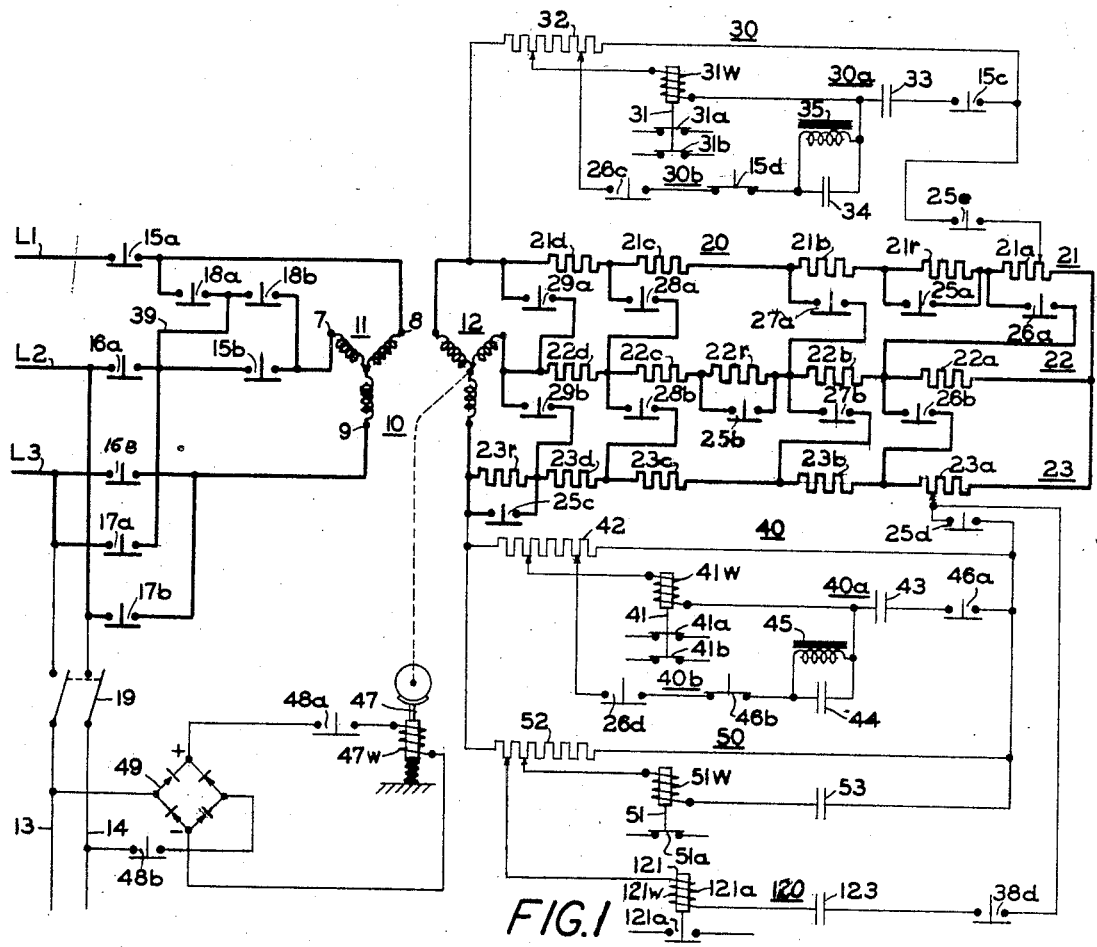
Fig. 1 is a complete power circuit and a partial control circuit diagram of a control system embodying the invention.

Referring to Fig. 1, a wound rotor induction motor 10 has its primary winding 11 arranged to be energized from a source of three phase power (not shown) through conductors L1, L2, and L3. A Y-connected motor is illustrated in the drawings, but the control system herein described can be used with a delta connected motor as well. The primary winding 11 has three terminals 7, 8 and 9. For causing the motor 10 to rotate in a direction to lower a load the terminal 8 is connected to the conductor L1 through contacts 15a, the terminal 7 is connected to the conductor L2 through contacts 15b and 16a, and the terminal 9 is connected to the conductor L3 through contacts 16b. For causing the motor 10 to rotate in a direction to hoist a load the connections from the terminals 7 and 9 to the conductors L2 and L3 are reversed through contacts 17a and 17b. For single phase braking operation, the terminals 7 and 8 are interconnected through contacts 18a and 18b and a point on the interconnection is connected to the conductor L2 through a conductor 39 and the contacts 16a, and the terminal 9 is connected to the conductor L3 through the contacts 16b.

The motor 10 has its secondary winding 12 connected through slip rings to a polyphase network comprising a Y-connected resistor 20 having each of its three branches 21, 22, and 23 divided into five sections a, b, c, d, and r which are referred to by subscripts to the reference character of the corresponding branch. Thus branch 21 comprises sections 21a, 21b, 21c, 21d, and 21r. The resistance sections 21r, 22r, and 23r are arranged to be short circuited by contacts 25a, 25b, and 25c, respectively. The resistance sections 21a, 22a, and 23a are of equal ohmic value and are arranged to be short circuited by contacts 26a and 26b; the additional resistance sections 21b, 22b and 23b are of equal ohmic value and together with the section 21r are arranged to be short circuited by contacts 27a and 27b; the additional resistance sections 21c, 22c and 23c are of equal ohmic value and together with the section 22r are arranged to be short circuited by contacts 28a and 28b; and the additional resistance sections 21d, 22d and 23d are of equal ohmic value and are arranged to be short circuited by contacts 29a and 29b. The resistance sections 21r, 22r and 23r preferably are of equal ohmic value, but may be unequal if desired. Preferably, the resistance of the sections 21a, 22a, and 23a is about one-half of the total resistance of the resistor network 20.

Acceleration and speed control relays 31, 41 and 51 are adjustably connected in individual relay circuits 30, 40 and 50, respectively, which are connected across voltage dividers 32, 42 and 52, respectively. The voltage dividers 42 and 52 are connected in parallel through contacts 25d across one of the branches of the secondary resistor 20 shown as the branch 23, one connection being adjustable along the section 23a as shown, and the voltage divider 32 is connected through contacts 25e across a different branch of the secondary resistor 20, shown as branch 21, one connection being adjustable along the section 21a as shown. The relay 31 has an operating winding 31w and normally closed contacts 31a and 31b and the relay 41 has an operating winding 41w and normally closed contacts 41a and 41b. The relay 51 has an operating winding 51w and normally closed contacts 51a.

In the relay circuit 30 the relay operating winding 31w, a condenser 33, and normally open contacts 15c are connected in series across an adjustable portion of the voltage divider 32 to form a series resonant circuit 30a. Also connected in series with the winding 31w across an adjustable portion of the voltage divider 32 and forming with the winding 31w a series-parallel resonant circuit 30b are normally open contacts 26c and normally closed contacts 15d and a parallel circuit including a condenser 34 and a non-saturable reactor 35.

In the relay circuit 40 the relay operating winding 41w, a condenser 43, and normally open contacts 46a are connected in series across an adjustable portion of the voltage divider 42 to form a series resonant circuit 40a. Also connected in series with the winding 41w across an adjustable portion of the voltage divider 42 and forming with the winding 41w a series parallel resonant circuit 40b are normally open contacts 26d and normally closed contacts 46b and a parallel circuit including a condenser 44 and a non-saturable reactor 45.

In the relay circuit 50 the relay operating winding 51w and a condenser 53 are connected in series across an adjustable portion of the voltage divider 52 to form a series resonant circuit.

For preventing excessive speeds during counter-torque lowering a series resonant relay circuit 120 is provided. The relay circuit 120 is connected through an adjustable portion of the voltage divider 52, and comprises a series circuit including normally open contacts 38d, a condenser 123, and an operating winding 121w of a relay 121 having normally open contacts 121a.

The relay circuits 50 and 120 and the series resonant portions 30a and 40a of the relay circuits 30 and 40 are of the type disclosed and claimed in Patent No. 2,165,491, issued July 11, 1939, to J. D. Leitch, and the series parallel portions 30b and 40b of the relay circuits 30 and 40 are of the type disclosed and claimed in Patent No. 2,232,257, issued to A. H. Myles on February 18, 1941. As more fully described in these patents, the electrical constants of the capacitances and inductances in the relay circuits 30, 40 and 50 are so chosen in relation to each other and to the magnitude and frequency of the secondary voltage drop to which the relay circuits 30, 40 and 50 are subjected that the relay windings 31w, 41w, and 51w are sufficiently energized at certain predetermined speeds of the motor 10 to maintain their respective associated contacts open, but are not sufficiently energized at certain other speeds of the motor 10 to maintain their respective associated contacts open. The reactances of the winding 121w and the condenser 123 are so chosen that for all safe counter-torque lowering speeds the contacts 121a remain open, but are closed as soon as the counter-torque lowering speed reaches an excessive value.

Figure 2:
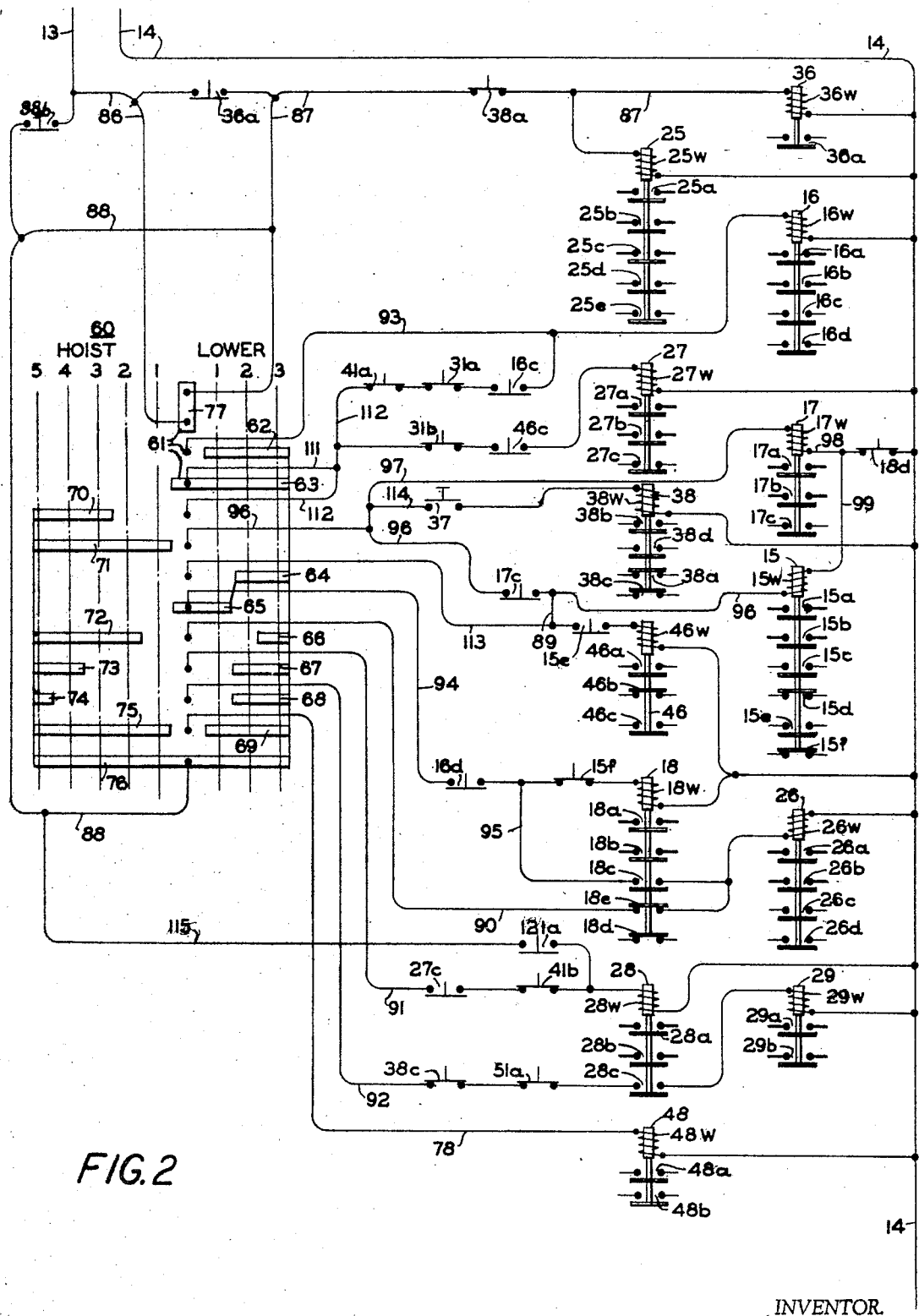
Fig. 2 is a diagram of the remainder of the control circuit of Fig. 1 and combines therewith to complete the circuit diagram.

The control circuits of Fig. 2 are energized from the conductors L2 and L3 through the conductors 13 and 14 when a knife switch 19 shown in Fig. 1 is closed. A spring applied, electromagnetically released friction brake 47 for the motor 10 has a direct current operating winding 47w connected through normally open contacts 48a to the direct current terminals of a suitable rectifier 49 having its alternating current terminals connected across the conductors 13 and 14 through normally open contacts 48b.

Operating means for all of the contacts shown in Fig. 1 except those of the relays 31, 41, 51, and 121 are shown in Fig. 2. The contacts shown in Fig. 1 and referred to by numerals with distinguishing subscripts, except those of the relays 31, 41, 51, and 121, are parts of the electromagnetic contactors or relays shown completely in Fig. 2. Each of the complete contactors or relays is referred to by the same reference numeral as its parts but without any subscript. Each of the contactors or relays has an operating winding which is referred to by the reference numeral of its associated contactor or relay and the subscript w.

Referring now to Fig. 2, a low voltage protection relay 36 has an operating winding 36w and normally open contacts 36a. A push button 37 controls, over a circuit to be described, the energization of a relay 38 having an operating winding 38w, normally closed contacts 38a and 38c, and normally open contacts 38b and 38d.

A multi-position master switch 60 having a plurality of circuit terminals 61 movable through three successive lowering positions and five successive hoisting positions is provided for controlling the operation of the various contactors and relays which affect operation of the motor 10. The master switch 60 has lowering contact segments 62-69 inclusive, hoisting contact segments 70-75 inclusive, a contact segment 76 which engages one of the circuit terminals 61 in all positions, and a contact segment 77 which engages two of the circuit terminals 61 only in the off position. The contact segments 62-76 inclusive are electrically interconnected. The push button 37 is preferably mounted in the operating handle of the master switch 60 in a well known manner.

Operation

A more complete understanding of this invention may be had from a consideration of its operation. Assuming that the switch 19 is closed, if the master switch 60 is in the off position, an energizing circuit for the operating winding 36w of the relay 36 is completed from the conductor L3 through the switch 19, the conductor 13, a conductor 86, one of the circuit terminals 61, the contact segment 77, another of the circuit terminals 61, a conductor 87, the normally closed contacts 38a, the winding 36w, the conductor 14, and the knife switch 19 to the conductor L2. As a result of the energization of its operating winding 36w, the relay 36 operates to close its contacts 36a which complete a circuit directly from the conductor L3 through the conductors 13 and 86 to the conductor 87 to maintain the winding 36w energized regardless of the position of the master switch 60. A conductor 88 electrically connects the conductor 87 to the circuit terminal 61 which is in engagement with the contact segment 76 to maintain a connection between the contact segments 62-76, inclusive, and the conductor L3 at all times when the contacts 36a and the switch 19 are closed or when the master switch is in the off position and the switch 19 is closed.

Concurrently with the energization of the winding 36w, the operating winding 25w is energized causing the contactor 25 to close its contacts 25a, 25b and 25c which short circuit the resistance sections 21r, 22r, and 23r, respectively, and to close its contacts 25d and 25e which connect the voltage dividers 32, 42, and 52 across portions of the secondary resistance 20. The winding 25w is connected in parallel with the winding 36w between the contacts 38a and the conductor 14. The contacts 38a are closed at all times to maintain the contactor 25 in its energized position except when the push button 37 is operated to its closed position as described hereinafter.

In all master switch positions except the off position the brake operating winding 47w is energized through the contacts 48a and 48b and the brake 47 is released. The energizing circuit for the winding 48w which when energized maintains the contacts 48a and 48b closed is completed in all lowering positions from the segment 69 and in all hoisting positions from the segment 75 through a conductor 78 and the winding 48w to the conductor 14.

Hoisting

Assuming that a load is to be hoisted by the motor 10, the master switch 60 may be moved to the first hoisting position to thereby complete an energizing circuit for the winding 17w from the contact segment 71 through conductors 96 and 97, the winding 17w, a conductor 98, and the normally closed interlock contacts 18d to the conductor 14. In response to the energization of its operating winding 17w the contactor 17 closes its contacts 17a, 17b, and 17c. Closure of the contacts 17b connects the terminal 9 of the primary winding 11 to the conductor L2, closure of the contacts 17a partially completes a circuit from the terminal 7 of the winding 11 to the conductor L3, and closure of the contacts 17c completes an energizing circuit for the winding 15w from the segment 71 through the conductor 96, the contacts 17c, the winding 15w, conductors 99 and 98, and the interlock contacts 18d to the conductor 14.

In response to the energization of its operating winding 15w, the contactor 15 operates to close its contacts 15a, 15b, 15c, and 15e and to open its contacts 15d and 15f. Closure of the contacts 15a connects the terminal 8 of the primary winding 11 to the conductor L1, and closure of the contacts 15b completes the connection of the terminal 7 to the conductor L3. Closure of the contacts 15c completes the series resonant relay circuit 30a. Opening of the contacts 15d insures that the series-parallel relay circuit 30b is interrupted during hoisting and the contacts 15f open an interlock with the winding 16w. Closure of the contacts 15e completes an energizing circuit for the operating winding 46w of the relay 46 from the segment 71 through the conductor 96, the contacts 17c, a conductor 89, the contacts 15e, and the winding 46w to the conductor 14.

As a result of the energization of its operating winding 46w, the relay 46 closes its contacts 46a to complete the series resonant circuit 40a, opens its contacts 46b to insure that the series-parallel resonant circuit 40b is interrupted during hoisting, and closes its contacts 46c to partially complete an energizing circuit for the operating winding 27w of the contactor 27.

When the master switch 60 is in the first hoisting position, the contactors 15 and 17 are in their energized positions and the motor 10 is so connected to the source as to tend to accelerate a load upward. All of the sections of the resistance 20 except the r sections are connected in the secondary circuit so that the torque of the motor 10 is comparatively low, the speed-torque characteristic being shown by the curve 101 of Fig. 3. As soon as the primary winding 11 is connected to the three phases of the source, the induced current in the secondary winding 12 is of a comparatively high magnitude and frequency so that the voltage drop across the branches 21 and 23 of the secondary resistance 20 causes energization of the windings 31w, 41w, and 51w of the relays 31, 41, and 51. The relays 31, 41, and 51 are therefore in their energized positions and the contacts 31a, 31b, 41a, 41b, and 51a are open.

Movement of the master switch 60 to the second hoisting position causes energization of the winding 26w over a circuit extending from the contact segment 72 through a conductor 90, the normally closed interlock contacts 18e, and the winding 26w to the conductor 14. As a result of the energization of its operating winding 26w, the contactor 26 closes its contacts 26a and 26b to short circuit the resistance sections 21a, 22a, and 23a, closes its contacts 26c in the series-parallel resonant relay circuit 30b, and closes its contacts 26d in the series-parallel resonant relay circuit 40b. Closure of the contacts 26c and 26d has no effect at this time since the contacts 46d and 46b are open.

Figure 3:
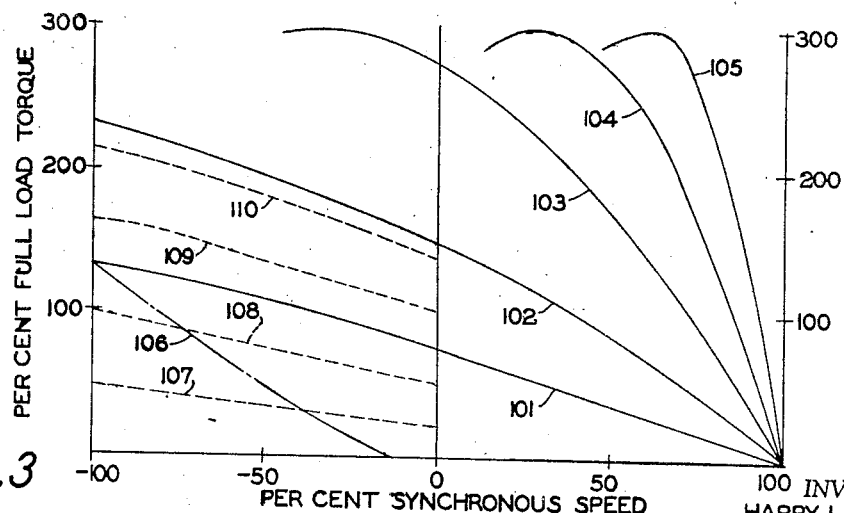
Fig. 3 is a graph illustrating certain speed-torque characteristics of an induction motor when controlled in accordance with this invention.

By short circuiting the resistance sections 21a, 22a, and 23a, the operation of the contactor 26 to its energized position increases the hoisting torque, and the speed-torque characteristic of the motor 10 is now shown by the curve 102 of Fig. 3.

As soon as the contactors 15 and 17 operate to their energized positions, the winding 31w is energized by the secondary voltage due to the series resonant nature of its energizing circuit and causes the relay 31 to open its contacts 31a and 31b. When the frequency of the secondary voltage decreases to a value corresponding to approximately 40% of the synchronous speed of the motor 10, the impedance of the series resonant circuit 30a has so increased that the energization of the winding 31w has decreased sufficiently to permit the contacts 31a and 31b to reclose. Closure of the contacts 31a has no operative effect at this time.

If the master switch 60 is now moved to the third hoisting position, or if it is already in that position, an energizing circuit for the winding 27w is completed from the segment 70 through a conductor 112, the now closed contacts 31b and 46c, and the winding 27w to the conductor 14.

As a result of the energization of its operating winding 27w, the contactor 27 closes its contacts 27a and 27b to short circuit the additional resistance sections 21b, 22b, and 23b and closes its contacts 27c to partially complete an energizing circuit for the winding 28w of the contactor 28. Short circuiting of the resistance sections 21b, 22b, and 23b causes the torque of the motor 10 to increase again and the speed-torque characteristic of the motor 10 is now shown by the curve 103.

Acceleration of the motor 10 to a speed equal to approximately 70% of its synchronous speed causes a decrease in the energization of the winding 41w of the relay 41 as a result of an increase in the impedance of the series resonant circuit 40a due to the reduction in the frequency and magnitude of the secondary voltage. The decrease in the energization of the winding 41w permits the contacts 41a and 41b to reclose. Closure of the contacts 41a has no operative effect at this time.

If the master switch is now moved to the fourth hoisting position, or if it is already in the fourth position, an energizing circuit for the winding 28w is completed from the contact segment 73, through a conductor 91, the now closed contacts 27c and 41b, and the winding 28w to the conductor 14. As a result of the energization of its operating winding 28w, the contactor 28 closes its contacts 28a and 28b to short circuit the additional resistance sections 21c, 22c and 23c and closes its contacts 28c to partially complete an energizing circuit for the winding 29w. The torque of the motor 10 is again increased and the motor 10 now operates along the curve 104.

When the motor 10 reaches a speed of approximately 85% of synchronous speed, its secondary voltage and frequency are such as to cause a decrease in the energization of the winding 51w of the relay 51 which permits the contacts 51a to reclose.

If the master switch 60 is now moved to the fifth hoisting position, or if it is already in that position, an energizing circuit for the winding 29w is completed from the contact segment 74 through a conductor 92, the now closed contacts 38c, 51a, and 28c, and the winding 29w to the conductor 14. As a result of the energization of its operating winding 29w, the contactor 29 closes its contacts 29a and 29b to short circuit the additional resistance sections 21d, 22d, and 23d. The torque of the motor 10 is again increased and the motor now operates along the curve 105. All of the secondary resistance 20 is now short circuited and the motor 10 accelerates to its normal running speed, its actual speed depending upon the size of the load being hoisted. Inasmuch as the push button 37 has not been closed during hoisting operations, the resistance sections 21r, 22r, and 23r have been short circuited, and the resistor 20 has therefore been balanced over all steps of acceleration, and the motor 10 has provided several hoisting torque values throughout a relatively high range.

Returning the master switch 60 to the off position causes step by step insertion of the resistance sections d, c, b, and a in the order named, and consequent slow down and stoppage of the motor 10. At the off position, the winding 48w of the relay 48 is deenergized and the contacts 48a and 48b open to cause deenergization of the brake winding 47w and consequent application of the brake 47 which assists in bringing the load to a standstill and holds it in its hoisted position.

Lowering

If the master switch 60 is moved from the off position to the first lowering position, the brake 47 is released as hereinbefore described and the operating windings 16w, 18w and 26w are energized in succession in the order named. The energizing circuit for the winding 16w is from the contact segment 62 through a conductor 93 and the winding 16w to the conductor 14. The energizing circuit for the winding 18w is from the contact segment 65 through a conductor 84, the now closed interlock contacts 16d, the normally closed interlock contacts 15f, and the winding 18w to the conductor 14. The energizing circuit for the winding 26w is from the contact segment 65 through the conductor 84, the now closed interlock contacts 16d, a conductor 95, the now closed interlock contacts 18c, and the winding 26w to the conductor 14.

The contactors 16 and 18 operate in response to the energization of their operating windings 16w and 18w to close their contacts 16a, 16b, 18a, and 18b which connect the primary winding 11 for single phase braking. The terminals 7 and 8 of the primary winding 11 are interconnected by the contacts 18a and 18b and a point on the interconnection is connected to the source through the conductor 39, the contacts 16a, and the conductor L2. The terminal 9 of the primary winding 11 is connected to the source through the contacts 16b and the conductor L3. Operation of the contactor 16 to its energized position also closes the contacts 16c which complete a holding circuit for the winding 16w which becomes effective when the master switch 60 is returned to the off position as hereinafter described. Operation of the contactor 18 to its energized position also opens the contacts 18e and 18d which serve as interlocks with the contactor 26 and the contactors 15 and 17, respectively.

The contactor 26 operates in response to the energization of its operating winding 26w to close its contacts 26a and 26b which short circuit the resistance sections 21a, 22a, and 23a. The secondary circuit of the motor 10 now includes a predetermined amount of the resistance 20. The operation of the contactor 26 to its energized position also causes closure of the contacts 26c and 26d in the relay circuits 30 and 40, respectively, completing the series-parallel resonant circuits 30b and 40b, respectively. The conditions of operation of the relays 31 and 41 are of no consequence while the master switch is in the first lowering position and the effect of the series parallel connection is described in detail hereinafter in connection with the return of the master switch 60 to the off point.

A portion of the primary winding 11 is now short circuited and a portion is energized by a single phase current from the source through the conductors L2 and L3. With the resistance sections b, c, and d now in the secondary circuit, the braking torque of the motor 10 is shown by the curve 106 of Fig. 3. This type of braking connection is claimed and more fully described in my Patent No. 2,233,501, issued March 4, 1941. While the single phase braking connections are made, no downward motor torque is produced so that small loads are not forced downward, but if an overhauling load is on the hoist, the motor exerts a braking torque which varies as shown by the curve 106. The braking torque increases in magnitude as the speed increases even at speeds above synchronism.

A small amount of downward motor torque is obtained upon movement of the master switch 60 to the second lowering position. The windings 18w and 26w are deenergized upon movement of the master switch 60 to the second lowering position by interruption of the circuit between the contact segment 65 and the conductor 94 and the contactors 18 and 26 return to their deenergized positions. Deenergization of the winding 26w causes the contactor 26 to open its contacts 26a and 26b to remove the short circuit from the resistance sections 21a, 22a, and 23a. The winding 16w is maintained energized and the windings 15w and 46w are energized to cause operation of the contactor 15 and the relay 46, respectively. The energizing circuit for the winding 15w is from the segment 64 through the conductors 113, 89 and 96, the winding 15w, the conductors 99 and 98, and the now closed interlock contacts 18d to the conductor 14. The energizing circuit for the winding 46w is from the conductor 113 through the now closed interlock contacts 15e and the winding 46w to the conductor 14. Deenergization of the winding 18w causes the contacts 18a and 18b to open, thus interrupting the inter-connection between the terminals 7 and 8. Energization of the winding 15w causes the contactor 15 to close its contacts 15a and 15b so that the primary winding 11 is now connected to the source through the contacts 15a and the conductor L1, the contacts 15b and 16a and the conductor L2, and the contacts 16b and the conductor L3 thus causing a downward motor torque to be exerted, its magnitude being shown by the curve 101.

The contacts 26c and 26d also open in the second lowering position to interrupt the series parallel resonant circuits 30b and 40b, respectively. Operation of the contactor 15 to its energized position also causes the opening of its contacts 15d to interrupt the series parallel resonant circuit 30b and causes closure of its contacts 15c which complete the series resonant circuit 30a. Operation of the relay 46 in response to the energization of its winding 46w causes closure of the contacts 46a to complete the series resonant circuit 40a, causes opening of its contacts 46b to interrupt the series parallel resonant circuit 40b, and causes closure of its contacts 46c to partially complete a circuit to the winding 27w. If the motor 10 is at standstill or rotating at a speed less than 40% of synchronism, the relay windings 31w, 41w and 51w are each energized by the secondary voltage drop as during hoisting operations and the contacts 31a, 31b, 41a, 41b, and 51a are open.

With the master switch 60 in the second lowering position, acceleration of the motor 10 to 40% of its synchronous speed causes reduced energization of the winding 31w of the relay 31 and consequent reclosure of the contacts 31a and 31b. Closure of the contacts 31a has no effect at this time, but closure of the contacts 31b results in energization of the operating winding 27w and consequent operation of the contactor 27. The energizing circuit for the winding 27w is from the segment 63 through the conductors 111 and 112, the now closed contacts 31b and 46c, and the winding 27w to the conductor 14. Operation of the contactor 27 to its energized position causes closure of its contacts 27a and 27b to short circuit the resistance sections a and b in each of the three branches of the resistance 20. The motor now operates along the curve 103.

Closure of the contacts 27c due to energization of the winding 27w partially completes an energizing circuit for the operating winding 28w of the contactor 28. When the speed of the motor 10 increases to 70% of its synchronous speed, the winding 41w is practically deenergized and the contacts 41a and 41b reclose. Closure of the contacts 41a has no effect at this time, but closure of the contacts 41b completes an energizing circuit for the winding 28w over a circuit from the segment 67, through the conductor 91, the now closed contacts 27c and 41b, and the winding 28w to the conductor 14. The contactor 28 in response to the energization of its winding 28w closes its contacts 28a and 28b to short circuit all of the resistance sections except sections 21d, 22d, and 23d causing the motor to operate along the curve 104. The contacts 28c also close and partially complete a circuit to the winding 29w.

When the motor 10 has accelerated to approximately 85% of its synchronous speed, the energization of the winding 51w is reduced and the contacts 51a close to complete an energizing circuit for the winding 29w from the segment 68 through the conductor 92, the now closed contacts 38c, 51a, and 28c, and the winding 29w to the conductor 14. The contactor 29 in response to the energization of its winding 29w closes its contacts 29a and 29b to short circuit the remainder of the resistance 20 and the motor 10 now operates along the curve 105. The motor 10 now operates at speeds slightly below synchronous speed if the load is not overhauling and at speeds slightly above synchronous speed if the load is overhauling.

Movement of the master switch to the third position in the lowering direction completes a circuit from the segment 66, through the conductor 90, the normally closed interlock contacts 18e, and the winding 26w to the conductor 14. If the motor 10 has accelerated so that the contacts 31b of the relay 31 are closed, the closure of the contactor 26 has no effect upon motor operation. If the motor has not had an opportunity to accelerate to 40% speed, however, closure of the contacts 26a and 26b of the contactor 26 short circuits resistance sections 21a, 22a and 23a of the resistor 20 to increase the torque of the motor 10 from that of curve 101 to that of curve 102.

When the master switch is moved from the first lowering position to the second lowering position, all of the resistance 20 is in the secondary circuit until approximately 40% speed is reached. The motor thus exerts at first a small downward torque. If the master switch is moved quickly from the off position to the third lowering position a higher lowering torque is immediately available due to the fact that the contacts 26a and 26b remain closed. The relays 31, 41 and 51 are responsive in the third position lowering in the same manner as in the second position lowering to effect sequential energization of the windings 27w, 28w, and 29w and consequent operation of the contactors 27, 28, and 29 to their energized positions.

Movement of the master switch 60 back to the off position from the second or third lowering positions causes the motor torque to be discontinued and the brake 47 to be applied. When the master switch moves through the first lowering position, it is obvious that the operating winding 16w remains energized, and that the operating windings 18w and 26w are again energized as described hereinbefore to set up single phase braking connections and cause retardation of the motor 10. Movement from the first lowering position to the off position does not effect deenergization of the windings 16w, 18w, and 26w at once. The contactor 16 remains in its energized position by virtue of an energizing circuit for its winding 16w from the segment 63 through the conductors 111 and 112, the contacts 41a, 31a, and 16c, the conductor 93, and the winding 16w to the conductor 14. The contactor 18 remains in its energized position by virtue of an energizing circuit for its winding 18w from the segment 65, through the conductor 94, the now closed contacts 16d and 15f, and the winding 18w to the conductor 14. The contactor 26 remains in its energized position by virtue of an energizing circuit for its winding 26w from the contact segment 65 through the conductor 94, the now closed contacts 16d, the conductor 95, the now closed contacts 18c, and the winding 26w to the conductor 14.

The contacts 15c and 46a open, and the contacts 26c and 26d and 15d and 46b close upon energization of the winding 26w and deenergization of the windings 16w and 46w as the master switch 60 moves from the second lowering position to the off position, and consequently the series resonant circuits 30a and 40a are interrupted and the series parallel resonant circuits 30b and 40b are completed. It is to be noted that since the winding 26w is not energized until the contactor 18 is in its energized position, all transients in the secondary voltage have subsided before the contacts 26c and 26d close.

During single phase braking there are two distinct currents in each branch of the secondary circuit of the motor 10. Assuming a 60 cycle source of supply, one of these currents is a positive sequence current that varies in frequency from zero cycles per second at synchronous speed in one direction of rotation to 60 cycles per second at standstill and to 120 cycles per second at synchronous speed in the opposite direction of rotation. The other current is a negative sequence current that varies from 120 cycles per second at synchronous speed in the direction causing the positive sequence current to be at zero frequency to 60 cycles per second at standstill and to zero cycles per second at synchronous speed in the opposite direction of rotation, that is, at synchronous speeds, one of the two sequence currents has a frequency of 120 cycles per second, whereas the other one has a frequency of zero cycles per second and at zero speed the frequency of the currents is equal and is 60 cycles per second.

The series parallel resonant circuits 30b and 40b are set to cause operative energization of the windings 31w and 41w when the frequency of the voltage across the voltage dividers 32 and 42 approaches the frequency of the source, or 60 cycles per second if a 60 cycle source is assumed. As the motor approaches zero speed, both the positive sequence currents and the negative sequence current are approaching 60 cycles per second, and therefore both currents affect the relay circuits 30b and 40b in a similar manner. The windings 31w and 41w remain deenergized during single phase braking as long as the motor 10 is rotating above a predetermined minimum speed. The frequency-current curves of the series-parallel resonant circuits 30b and 40b are peaked at 60 cycles and are at a low current value at all frequencies substantially above and below 60 cycles per second. As the motor 10 is retarded due to single phase braking torque, the current through one or the other or both of the windings 31w and 41w increases rapidly at a predetermined value of motor speed close to zero speed and causes operation of either or both of the relays 31 and 41 to their energized positions. The contacts 31a or 41a, or both, thereupon open to interrupt the circuit to the operating winding 16w of the contactor 16. Deenergization of the winding 16w causes the contactor 16 to open its contacts 16d which interrupts the circuits to the windings 18w and 26w and the contactors 18 and 26 thereupon open their contacts 18a and 18b and 26a and 26b which together with the opening of the contacts 16a and 16b removes the single phase braking connections. The motor 10 is now rotating at a slow enough speed to permit the holding brake 47 to bring it to standstill. When the master switch 60 is moved to the off position from the lowering positions, both single phase braking and friction braking are in effect since the relay 48 is deenergized and the contacts 48a and 48b are open to cause deenergization of the operating winding 47w of the brake 47 as soon as the off position is reached. The motor 10 is thus quickly brought to a standstill and the single phase connections automatically removed to prevent a continuous flow of current through the short circuited portion of the primary winding.

It is to be noted that the relay circuit 30 is connected for energization from the branch 21 of the secondary resistor 20 whereas the relay circuit 40 is connected for energization from the branch 23. This is because at or near standstill, when the operation of the relays 31 and 41 is to be effected, the secondary current is unevenly distributed among the three branches of the secondary circuit. In one position of the secondary winding 12 with respect to the primary winding 11, the current in two of the branches might be at a maximum value while the current in the third branch might be at a minimum value which is close to zero. In another position of the secondary with respect to the primary, the currents in two of the branches might be approximately 85% of their normal value and the current in the third branch one-half of its normal value. However, one of the branches 21 or 23, at all times during single phase braking, has a current in excess of one-half of the normal value although the other of the branches 21 or 23 might at the same time have a current value of nearly zero. By using both relay circuits 30b and 40b during single phase braking and connecting the contacts 31a and 41a in series with the winding 16w, it is always possible to have a sufficient voltage drop across either branch 21 or 23 for one or the other of the windings 31w and 41w to be energized to effect operation of the contactor 16 to its deenergized position.

If it is desired to lower a load by counter-torque control, the push button 37 may be closed and the master switch 60 moved to any one of the hoisting positions to complete a circuit from the contact segment 71 through the conductors 96 and 97, a conductor 114, the push button 37, and the winding 38w to the conductor 14. The relay 38 in response to the energization of its operating winding 38w opens its contacts 38a in the conductor 87 to deenergize the windings 25w and 36w and closes its contacts 38b to complete a circuit from the conductor 13 to the conductor 88. Deenergization of the winding 36w permits the contacts 36a of the relay 36 to open and interrupt the circuit through the conductor 87 from the conductor 13 to the conductor 88. Deenergization of the winding 25w permits the contactor 25 to open its contacts 25a, 25b, and 25c to interrupt the short circuit connections around the resistance sections 21r, 22r, and 23r and to open its contacts 25d and 25e to disconnect the voltage dividers 32, 42, and 52 from the resistance 20. The relay windings 31w, 41w, and 51w consequently remain deenergized during counter-torque operation. The relay 38 also opens its contacts 38c to interrupt the circuit to the winding 29w thus preventing closure of the contactor 29 during counter-torque operation, and closes its contacts 38d to render the series resonant relay circuit 120 effective.

If the master switch 60 is in any of the hoisting positions and the push button 37 is closed, energizing circuits are also completed from the contact segment 71 to the conductor 14 through the windings 17w, 15w, and 46w causing operation of the contactors 15 and 17 and the relay 46 in the same manner as described for hoisting operations and the motor 10 exerts a hoisting torque.

If the master switch 60 is in the first hoisting position, all of the resistance 20 including the r sections is effective and the torque of the motor 10 is now extremely low and the speed-torque characteristic is shown by the curve 107. Only the portions of the speed-torque curves to the left of the zero point of the speed axis are shown for counter-torque operation, since counter-torque control is only used when the load is driving the motor 10 in a direction opposite to the rotation of its magnetic field.

If an increased counter-torque is desired, the master switch 60 may be moved to the second position in the hoisting direction. In this position an energizing circuit for the winding 26w is completed from the contact segment 72 through the conductor 80, the interlock contacts 18e, and the winding 26w to the conductor 14. The contactor 26 closes in response to the energization of its winding 26w to close its contacts 26a and 26b which short circuit resistance sections 21a, 22a, and 23a. Since the resistance sections 21r, 22r, and 23r are still in the secondary circuit, the secondary resistance 20 is still balanced, and its ohmic value is such as to cause the motor 10 to have a speed torque characteristic as shown by the curve 108.

Movement of the master switch 60 to the third hoisting position with the push button 37 closed causes an increase in the counter-torque from the curve 108 to the curve 109. In the third position the contactor 27 is operated to its energized position due to the energization of its winding 27w over the same circuit described in connection with the hoisting operation. The closure of the contacts 27a and 27b causes short-circuiting of the resistance sections 21b, 22b, 21r, and 23b. The resistor 20 is now unbalanced since the resistor 21r has been removed from the branch 21 and the sections 22r and 23r are still effective in the branches 22 and 23, respectively. This unbalancing results in a marked decrease in the reverse or hoisting torque of the motor 10 from that which would occur if the resistance 20 were balanced. This decreased value of reverse torque is shown by the speed-torque characteristic 109. If the resistance sections 22r and 23r were short circuited as during hoisting operations, the speed-torque characteristic would be curve 103. It is thus seen that by providing an unbalanced condition of the secondary resistance 20 a greatly reduced hoisting torque is obtained which is generally insufficient for hoisting a load, but which is sufficient for retarding the downward movement of an overhauling load.

A further increase of counter-torque is obtained upon movement of the master switch 60 to the fourth hoisting position while maintaining the push button 37 closed. In the fourth position the contactor 28 is operated to its energized position due to the energization of its winding 28w over the same circuit described in connection with the hoisting operation. Operation of the contactor 28 to its energized position causes closure of the contacts 28a and 28b which short circuits the resistance sections 21c, 22c, 22r, and 23c. The speed-torque characteristic of the motor is now shown by the curve 110, the resistance 20 being still unbalanced.

Since it is not necessary or desirable to have a greater value of counter-torque available than that obtained in the fourth position, movement of the master switch 60 to the fifth position during counter-torque braking does not cause any change in the secondary resistor 20. It is to be noted that while the relay 38 is energized, its contacts 38c are open and interrupt the circuit to the winding 29w of the contactor 29. Therefore movement of the master switch 60 to the fifth hoisting position while the push button 37 is closed does not cause operation of the contactor 29, and the speed-torque characteristic of the motor 10 remains the same as in the fourth position.

The contactors 27, 28, and 29 are interlocked so that they normally must operate in sequence due to the interlock contacts 27c and 28c. The contacts 31b, 41b, and 51a are closed during counter-torque operation due to the fact that the relay circuits 30, 40, and 50 are deenergized because the contacts 25d and 25e are open.

If the lowering speed should become excessive while the master switch 60 is in the first, second, or third counter-torque positions, the contactor 28 is automatically operated to its energized position. With the contacts 28a and 28b closed the speed torque characteristics is given by the curve 110 as in the fourth position thus tending to greatly reduce the lowering speed.

Automatic operation of the contactor 28 during counter-torque lowering is effected by the relay circuit 120. As the lowering speed during counter-torque operation increases the frequency of the secondary currents of the motor 10 also increases. At synchronous speed it is twice the frequency of the source. The series resonant circuit 120 may be adjusted so as to cause increased energization of the winding 121w at any suitable high frequency, for example twice line frequency. Energization of the winding 121w causes closure of the contacts 121a which complete a circuit from the energized conductor 88 through the conductor 115 to the winding 28w. The contactor 28 thereupon operates to increase the counter-torque to its maximum value thus slowing down the load.

It is apparent that the secondary resistance 20 is so constituted that a range of high torque values useful for hoisting and a range of low torque values useful for retarding overhauling loads are made readily available by simple manipulations of the push button 37 and the master switch 60. Furthermore, this simple and centralized control also provides for single phase braking.

Opening of the push button 37 at any time during counter-torque operation results in immediate stopping of the motor 10. This is because opening of the push button 37 interrupts the energizing circuit to the winding 38w which causes the relay 38 to open its contacts 38b and close its contacts 38a. Opening of the contacts 38b disconnects the master switch 60 from the source so that the winding 48w is deenergized causing opening of the contacts 48a and 48b and consequent deenergization of the brake winding 47w.

In order to cause the motor to reexert hoisting torques in the upper range after operation in the counter-torque positions, it is necessary to open the push button 37 and move the master switch back to the off point so that a circuit to the windings 36w and 25w can be reestablished through the contact segment 77 and the contacts 38a.

I claim:

1. The combination with a polyphase wound rotor induction motor control system which comprises a resistance network having a plurality of branches each having a terminal adapted to be connected to a terminal of the secondary winding of the motor to form, when so connected, a closed polyphase network with said secondary winding, each of said branches including a plurality of resistance sections connected in series with each other, and means operable to short circuit groups of resistance sections in sequence, each group comprising one or more sections of each branch, of additional short circuiting means operatively associated with at least some of the sections of more than one of the groups, respectively, and each of said additional short circuiting means being operable to render its associated group balanced and unbalanced selectively.

2. A control system for a polyphase wound rotor induction motor, comprising a resistance network having a plurality of branches each having a terminal adapted to be connected to a terminal of the secondary winding of said motor to form, when so connected, a closed polyphase network with said secondary winding, each of said branches comprising a plurality of conducting sections connected in series with each other, short circuiting means operable to short circuit in succession groups of conducting sections, each of which groups consists of at least one section of each branch, at least one section in each of some of the groups having an unequal ohmic resistance value with respect to at least one of the other sections in the same group, and means for altering the resistance of some of the sections to cause all of the sections in any one of the last mentioned groups to have the same ohmic value as the other sections in the same group.

3. A control system for a polyphase wound rotor induction motor, comprising a resistance network having a plurality of branches each having a terminal adapted to be connected to a terminal of the secondary winding of said motor to form, when so connected, a closed polyphase network with said secondary winding, each of said branches comprising a plurality of resistance sections connected in series with each other, means operable to short circuit groups of resistance sections in succession, each of said groups consisting of at least one section of each branch, each of the sections in one of said groups being connected directly to the said terminal of its respective branch, each of the sections in each of the remaining groups being separated from the terminal of its respective branch by an equal number of sections, some of the sections in some of said groups being of unequal ohmic value with respect to other sections in the same group, and means for altering the resistance of some of the sections to cause all of the sections in any group to have the same ohmic value.

4. In a combination including a polyphase wound rotor induction motor subject to overhauling loads and having a polyphase primary winding connected to a source of polyphase power for hoisting and lowering operations and a polyphase secondary winding, a plurality of resistance branches each having a terminal connected to a terminal of said secondary winding and forming a closed polyphase network with said secondary winding, each of said branches comprising a plurality of series connected conducting sections, short circuiting means operable to short circuit in steps, during hoisting and lowering operations of the hoist, groups of said conducting sections each of which consists of at least one section of each branch, all of the sections of the same group having equal ohmic value, and means operable only while said motor is connected for hoisting operations to change the resistance of portions of said conducting sections relative to other portions to render said closed network unbalanced, whereby operation of said short circuiting means while said resistance is changed controls the hoisting torque of said motor to regulate the lowering speeds of said overhauling loads.

5. A control system in accordance with claim 2 characterized in that said system includes switching means operable, while all of the sections in any group have the same ohmic value, to short circuit a portion of the primary winding of said motor and concurrently to connect a portion of the primary winding to a source of single phase power, whereby, upon operation of said switching means, the primary winding of said motor is connected for single phase braking, and in that said short circuiting means is operable, while the primary winding is connected for single phase braking, to short circuit a predetermined number of said resistance groups.

6. A control system in accordance with claim 4 characterized in that said system includes switching means operable to short circuit a portion of the primary winding of said motor and concurrently to connect a portion of the primary winding to a source of single phase power, whereby, upon operation of said switching means, the primary winding of said motor is connected for single phase braking, said short circuiting means being operable, while the primary winding is connected for single phase braking, to short circuit a predetermined portion of each of said resistance branches.

7. A motor control system for hoists and the like subject to overhauling descending loads, comprising a polyphase wound rotor induction motor for driving the hoist, means for controlling the direction of and speed of said motor comprising a plurality of contactors and a multiposition manual reversing controller for controlling said contactors, said controller having an off position and a plurality of hoisting positions, a normally balanced resistance network connected in a closed network with the secondary winding of said motor, additional resistance elements connected in at least one branch of said network, a contactor means operable when energized for short circuiting said additional resistance elements and operable when deenergized to remove said short circuit, a contact segment on said controller for partially establishing a control circuit for said contactor means while said controller is in said hoisting positions, and a manual means for completing said partially completed circuit to cause deenergization of said contactor means.

8. A motor control system for hoists and the like subject to overhauling descending loads, comprising a polyphase wound rotor induction motor for driving the hoist, a secondary resistance connected in a normally balanced polyphase closed network with the secondary winding of said motor, means for controlling the direction and speed of said motor comprising a plurality of electromagnetic contactors and a manual reversing controller, some of said contactors being adapted when energized to unbalance said closed network, said controller having an off position, a braking position and a plurality of running positions, contact segment means on said controller operable when said controller is moved to said braking position for energizing some of said contactors to set up single phase braking connections, a second contact segment means on said controller operable when some of the controller is moved to the running positions for partially completing a circuit for causing operation of said contactors adapted to unbalance said closed network and for energizing some of said contactors to connect the motor to a source of power for exerting a torque opposed to the torque of the overhauling load, and manual means operable for completing said partially completed circuit, whereby when said manual means is operated with the controller in some of said running positions some of said contactors operate to unbalance said secondary resistance and the motor torque is variable at will over a range above and below said braking torque.

9. A control system in accordance with claim 8 characterized in that a circuit control means is provided for rendering said manual means inoperative to further control said contactor means until said controller is returned to said off position.

10. The combination in a control system for a polyphase wound rotor induction motor having a polyphase secondary circuit including a plurality of branches and having its primary winding adapted to be connected single phase to a source of power, a control means operable for controlling said motor, and a relay means connected to one of said branches and responsive to a predetermined electrical condition of said one of said branches while the primary winding is connected single phase to said source of power for effecting operation of said control means, of a second relay means concurrently connected to another of said branches and concurrently responsive to the predetermined electrical condition of said other branch for effecting operation of said control means.

11. The combination with a polyphase wound rotor induction motor having a predetermined amount of resistance included in its secondary circuit and having a portion of its primary winding short-circuited and a portion of its primary winding connected to a single phase source of power, and extraneous means for driving the motor, of means responsive to the speed of said motor for disconnecting said primary winding from said source of power when the speed of said motor is substantially zero, said means comprising a pair of relays each responsive to the same predetermined electrical condition, and each being connected across a different phase of said secondary circuit and each responsive to said electrical condition of the phase to which it is connected.

12. A control system for a wound rotor induction motor subject to overhauling loads and having a polyphase primary circuit and a polyphase secondary circuit comprising an adjustable resistance adapted to be connected in the secondary circuit, a master control element having several positions of movement, an electrically operable friction brake, means operable when said master control element is in one position to apply said friction brake to hold said load at standstill, means operable when said master control element is in another position to release said brake, to short circuit a portion of said primary winding, to connect at least a portion of said primary winding across a single phase source of power, and to associate said adjustable resistance with the secondary winding, whereby single phase braking connections are completed and a braking torque is produced upon rotation of said motor by said overhauling load, and means operable, when said master control element is returned to said one position, to apply said friction brake and to prevent the removal of said single phase braking connection, and said last named means comprising a pair of relays each adapted to be connected so as to be responsive to a predetermined electrical condition of a different phase of the secondary circuit.

13. The combination with a motor control system for hoists and the like subject to overhauling descending loads, comprising a polyphase wound rotor induction motor for driving the hoist, a polyphase secondary resistance network, switching means operable for connecting a portion of the primary winding of said motor to a source of single phase power, for short-circuiting a portion of said primary winding, and for including a predetermined balanced portion of said secondary resistance network in the secondary circuit of said motor, whereby, upon operation of said switching means, said motor is connected for single phase braking and a braking torque is produced which opposes the torque of said overhauling load, and means operable for connecting said primary winding to a source of polyphase power to cause the motor to exert a motor torque opposing the torque of said overhauling load, of means operable upon operation of said last named means for connecting an unbalanced portion of said resistance network in the secondary circuit, whereby the motor torque opposing the torque of the overhauling load is caused to be comparable in magnitude to said braking torque at some speeds of said motor.

14. In a control system for a polyphase wound rotor induction motor subject to overhauling loads and having a primary winding and a secondary circuit which includes a secondary winding and a normally balanced adjustable resistor, means operable to short circuit a portion of said primary winding and to connect a portion of said primary winding to a single phase source of power, means operable while said primary winding is so connected to include a predetermined balanced amount of said adjustable resistor in said secondary circuit, whereby said motor exerts a maximum single phase braking torque opposing the torque of the overhauling load over a speed range extending from over synchronous speeds to zero speed, means operable to connect said primary winding to a polyphase source of power to cause said motor to exert a motor torque opposing the torque of the overhauling load, means operable to vary said adjustable resistor in steps while said primary winding is connected to said polyphase source of power, whereby several values of counter-torque are available, and means operable to unbalance said secondary circuit during each of said steps, whereby said motor torque values are comparable in magnitude to said single phase braking torque at some speeds of said motor.

15. A control system for a polyphase wound rotor induction motor having its secondary circuit closed through an adjustable resistor, means operable to connect the primary winding of said motor to a source of polyphase power for motoring operations, means operable to short circuit a portion of the primary winding of said motor and to connect a portion of the primary winding to a single phase source of power for braking operations, a plurality of relay circuits which are effective to control motoring and braking operations, each of said relay circuits including an operating winding, a condenser, and a parallel combination including a parallel connected condenser and reactor, means connecting the winding and the condenser of one of said relay circuits in series with each other across one phase of said secondary circuit during motoring operations, and means for connecting the operating winding and the parallel combination of at least two of the relay circuits in series with each other, each of said relay circuits when connected as last described being connected across a different phase of said secondary circuit during braking operations.

16. In a control system for hoisting mechanism, the combination with an induction motor comprising a stator and a rotor subject to an overhauling load, a resistor for varying the torque of said motor, a controller comprising switches at a series of stations for establishing circuits for controlling the direction and magnitude of the torque of said motor, means responsive to the controller at one station for connecting the stator of the motor to a polyphase source of power so that the motor exerts a hoisting torque tending to raise the load, adjusting means responsive to the controller for adjusting said resistor to vary said hoisting torque throughout a maximum range, means responsive to the controller at another station for short-circuiting a portion of the stator and connecting a portion of the stator to a single phase source of power, and means responsive to the controller at still another station for connecting the stator to a polyphase source of power so that the motor exerts a torque tending to force the load downward, of manual means associated with said controller and operable for causing said adjusting means to adjust said resistor when said stator is connected to the polyphase source of power so that the motor exerts a torque tending to raise the load, adjustment of said resistor by operation of said manual means causing said hoisting torque to be variable only throughout a minimum range.

HARRY L. WILCOX.